(12) United States Patent
Bufe, III et al.

(10) Patent No.: US 10,832,360 B2
(45) Date of Patent: Nov. 10, 2020

(54) VALUE SCORER IN AN AUTOMATED DISCLOSURE ASSESSMENT SYSTEM

(71) Applicant: International Business Machines Corporation, Armonk, NY (US)

(72) Inventors: John P. Bufe, III, Somerville, MA (US); Jared M. D. Smythe, Fuquay Varina, NC (US); Eric M. Woods, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 14/918,103

(22) Filed: Oct. 20, 2015

(65) Prior Publication Data

US 2017/0109848 A1 Apr. 20, 2017

(51) Int. Cl.
*G06Q 50/18* (2012.01)
*G06F 16/2457* (2019.01)
*G06F 16/9032* (2019.01)

(52) U.S. Cl.
CPC ..... *G06Q 50/184* (2013.01); *G06F 16/24578* (2019.01); *G06F 16/90332* (2019.01)

(58) Field of Classification Search
None
See application file for complete search history.

(56) References Cited

U.S. PATENT DOCUMENTS

| | | | |
|---|---|---|---|
| 6,044,354 A * | 3/2000 | Asplen, Jr. | G06Q 10/06 705/7.13 |
| 6,298,327 B1 | 10/2001 | Hunter et al. | |
| 8,935,291 B2 | 1/2015 | Chen | |
| 2003/0036945 A1* | 2/2003 | Del Vecchio | G06Q 10/10 705/310 |
| 2004/0181427 A1* | 9/2004 | Stobbs | G06F 17/2785 705/36 R |
| 2004/0220842 A1* | 11/2004 | Barney | G06Q 10/10 705/310 |
| 2005/0229094 A1* | 10/2005 | Friedl | G06F 17/3089 715/255 |

(Continued)

FOREIGN PATENT DOCUMENTS

EP 1582999 A1 * 10/2005 ............. G06Q 10/10

OTHER PUBLICATIONS

Lee, Kang, and Shin "Novelty-focused patent mapping for technology opportunity analysis," Technological Forecasting and Social Change 90(B): 355-365 (Jan. 2015). (Year: 2015).*

(Continued)

*Primary Examiner* — Jan P Mincarelli
(74) *Attorney, Agent, or Firm* — William H. Hartwell

(57) ABSTRACT

Software that uses machine-logic based algorithms to assess the value of idea descriptions by performing the following operations: (i) receiving an idea description pertaining to an idea; (ii) generating a density score for the idea, wherein the density score is based, at least in part, on one or more publication date densities of a set of works related to the idea description; (iii) generating a novelty score for the idea, wherein the novelty score is based, at least in part, on a comparison of the idea description to the set of works related to the idea description using natural language processing; and (iv) assessing the value of the idea based, at least in part, on the generated density score and the generated novelty score.

9 Claims, 3 Drawing Sheets

(56) References Cited

U.S. PATENT DOCUMENTS

| | | | |
|---|---|---|---|
| 2005/0240511 A1* | 10/2005 | Chadwick | G06Q 10/06 705/37 |
| 2006/0031092 A1* | 2/2006 | Cronin | G06Q 10/00 705/310 |
| 2006/0106627 A1* | 5/2006 | Al-Nujaidi | G06Q 10/10 705/310 |
| 2006/0122849 A1* | 6/2006 | Masuyama | G06F 17/30616 705/1.1 |
| 2006/0200423 A1* | 9/2006 | Powell | G06Q 10/10 705/59 |
| 2007/0016431 A1* | 1/2007 | Desai | G06Q 50/184 705/310 |
| 2007/0094297 A1* | 4/2007 | Barney | G06Q 10/04 |
| 2007/0136116 A1* | 6/2007 | Germeraad | G06Q 10/10 705/310 |
| 2007/0208669 A1* | 9/2007 | Rivette | G06F 17/30011 705/59 |
| 2007/0219854 A1* | 9/2007 | Mueller | G06Q 10/087 705/310 |
| 2009/0182624 A1* | 7/2009 | Koen | G06Q 10/10 705/37 |
| 2010/0114587 A1* | 5/2010 | Masuyama | G06Q 10/10 705/1.1 |
| 2011/0093539 A1* | 4/2011 | Laurin | G06Q 10/06 709/205 |
| 2011/0246379 A1* | 10/2011 | Maddox | G06O 40/06 705/310 |
| 2012/0016859 A1 | 1/2012 | Sears | |
| 2012/0278244 A1* | 11/2012 | Lee | G06O 50/184 705/310 |
| 2012/0296835 A1* | 11/2012 | Khan K | G06O 50/18 705/310 |
| 2012/0303537 A1* | 11/2012 | Bader | G06Q 10/06 705/310 |
| 2012/0317041 A1* | 12/2012 | Shaffer | G06Q 90/00 705/310 |
| 2013/0013295 A1 | 1/2013 | Lee | |
| 2013/0086032 A1* | 4/2013 | Lundberg | G06F 17/30864 707/706 |
| 2013/0166459 A1* | 6/2013 | Mohanty | G06Q 10/10 705/310 |
| 2013/0212030 A1* | 8/2013 | Lane | G06Q 10/00 705/310 |
| 2013/0238513 A1* | 9/2013 | Mohanty | G06Q 10/0633 705/310 |
| 2014/0012766 A1 | 1/2014 | Schindler | |
| 2014/0180934 A1 | 6/2014 | Surdeanu et al. | |
| 2014/0236573 A1* | 8/2014 | Allen | G06F 17/2785 704/9 |
| 2014/0258143 A1* | 9/2014 | Laroche | G06Q 50/184 705/310 |
| 2014/0324808 A1 | 10/2014 | Sandhu et al. | |
| 2014/0365206 A1* | 12/2014 | Convertino | G06F 17/2785 704/9 |
| 2014/0365207 A1* | 12/2014 | Convertino | G06F 17/2785 704/9 |
| 2015/0254576 A1* | 9/2015 | Lundberg | G06Q 10/00 705/310 |
| 2015/0293901 A1* | 10/2015 | Bufe, III | G06F 17/2785 707/725 |
| 2016/0012557 A1* | 1/2016 | Dixit | G06Q 50/184 705/310 |
| 2016/0048936 A1* | 2/2016 | Perkowski | G06Q 50/184 705/310 |
| 2016/0350886 A1* | 12/2016 | Jessen | G06Q 50/184 |

OTHER PUBLICATIONS

Li, Z. et al.; "A framework for automatic TRIZ level of invention estimation of patents using natural language processing, knowledge-transfer and patent citation metrics"; Computer-Aided Design, vol. 44, (2012). pp. 987-1010; Copyright 2012 Elsevier Ltd.

"Patent scoring tool". An IP.com Prior Art Database Technical Disclosure. IP.com No. 000004818, Electronic publication: Jun. 15, 2001.

* cited by examiner

VALUE SCORER IN AN AUTOMATED DISCLOSURE ASSESSMENT SYSTEM

BACKGROUND

The present invention relates generally to the field of assessing invention disclosures, and more particularly to determining the value of invention disclosures based on known related works.

Invention disclosures, generally speaking, are documents written by inventors (for example, scientists or engineers) about their inventions for use in determining whether patent protection should be sought for those inventions. One way to help assess the value of an invention disclosure is to perform a novelty search, which typically involves searching for works which may be relevant to the patentability of the described invention. The date on which a work is made available to the public is generally referred to as the work's publication date.

SUMMARY

According to an aspect of the present invention, there is a method, computer program product and/or system that performs the following operations (not necessarily in the following order): (i) receiving an idea description pertaining to an idea; (ii) generating a density score for the idea, wherein the density score is based, at least in part, on one or more publication date densities of a set of works related to the idea description; (iii) generating a novelty score for the idea, wherein the novelty score is based, at least in part, on a comparison of the idea description to the set of works related to the idea description using natural language processing; and/or (iv) assessing the value of the idea based, at least in part, on the generated density score and the generated novelty score.

DETAILED DESCRIPTION

Figure 1:
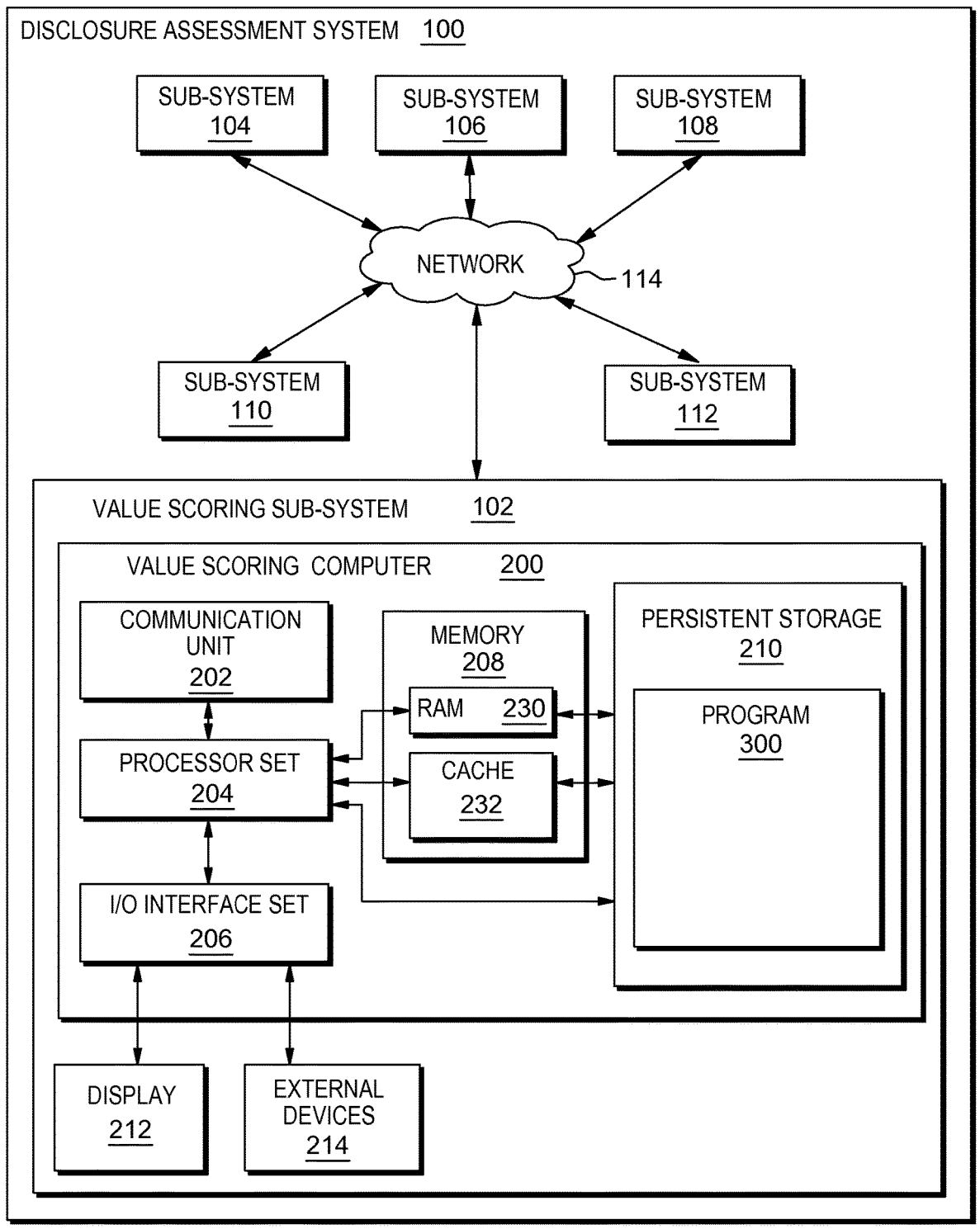
FIG. 1 is a block diagram view of a first embodiment of a system according to the present invention.

Novelty searching and valuation for invention disclosures can be a difficult, time-consuming process requiring human experts in various technological fields. Embodiments of the present invention use machine-logic based algorithms to assess the value of invention disclosures (and other idea descriptions), using density scores and novelty scores determined from known works related to the idea descriptions. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of disclosure assessment system 100, including: value scoring sub-system 102; sub-systems 104, 106, 108, 110, 112; communication network 114; value scoring computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with value scoring computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
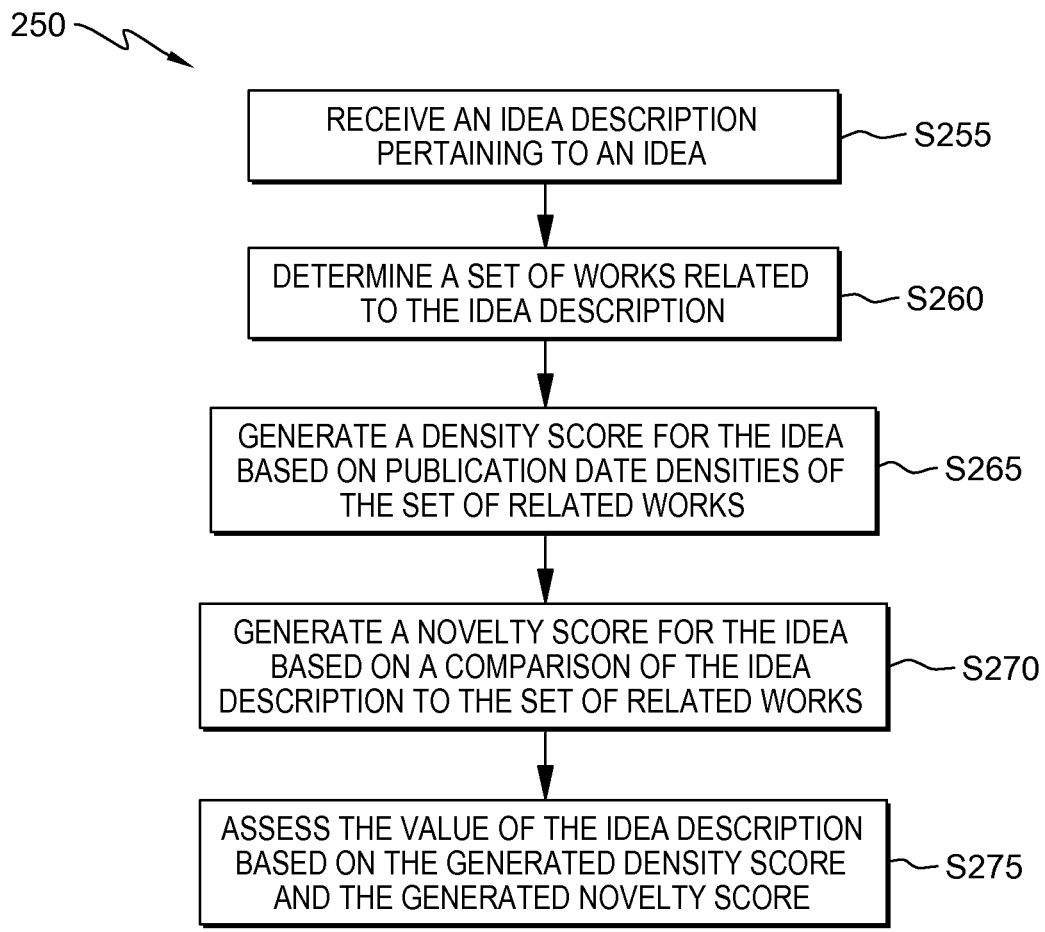
FIG. 2 is a flowchart showing a first embodiment method performed, at least in part, by the first embodiment system.
Figure 3:
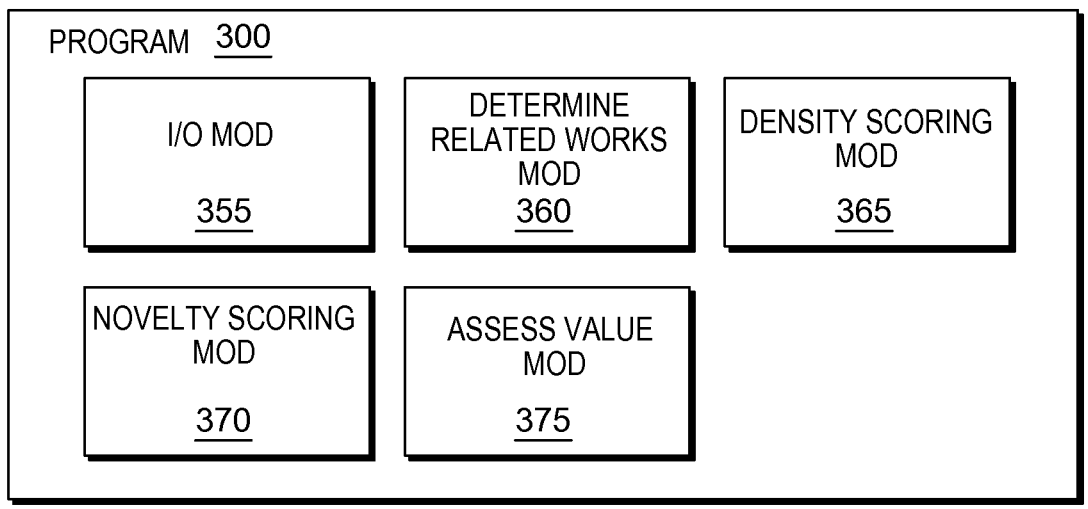
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

In the present example embodiment, disclosure assessment system 100 is a system for assessing invention disclosures, with sub-systems 102, 104, 106, 108, 110, and 112 for performing various disclosure assessment tasks. In particular, value scoring sub-system 102 is a sub-system for assessing the value of a given invention disclosure, where the given invention disclosure may potentially be utilized in applying for and/or obtaining patent protection in various jurisdictions. However, it should be recognized that although the present example embodiment is adapted for assessing the value of an invention disclosure for patent protection purposes, in other embodiments, the value of a wide variety of possible documents may be assessed for a wide variety of potential purposes. As such, invention disclosures of the present example embodiment will be generally referred to as "idea descriptions," as the present invention is not necessarily limited to systems and methods for assessing the value of invention disclosures for patentability purposes.

Processing begins at operation S255, where input/output ("I/O") module ("mod") 355 receives an idea description pertaining to an idea. Generally speaking, the idea description includes a set of natural language text describing an idea for which value scoring computer 200 will be assessing the value. In some embodiments, the idea description is a formal document (such as a draft of a scholarly article or a draft of a patent application), and in some embodiments, the idea description is an informal collection of information pertaining to the idea. Additionally, in some embodiments, the idea description includes images and/or video. Further, in some embodiments, the idea description may be input manually by a user of disclosure assessment system 100, and in other embodiments the idea description may be input automatically (or without substantial human intervention) using machine logic and/or artificial intelligence. In the present embodiment, the idea description is an invention disclosure that has been manually input by a user for the purpose of obtaining a value assessment.

Processing proceeds to operation S260, where determine related works mod 360 determines a set of works related to the idea description (also referred to as the "set of related works"). In many embodiments, the set of related works is determined by searching one or more databases that may be relevant to the idea description. For example, in the present embodiment, the set of related works is obtained by searching one or more databases that include patents and patent application publications. In other embodiments, the databases may include scholarly articles and/or other invention disclosures. However, this is not meant to be limiting, and the databases may include any of a wide variety of natural language (or other) works that may be related in subject matter to the idea description.

In certain embodiments, the databases are searched using topics extracted from the idea description using natural language processing (NLP). That is, in these embodiments, NLP is used to extract concepts or topics from the idea description. Then, determine related works mod 360 uses NLP to find works that cover similar topics. For example, mod 360 may use NLP techniques such as sentence splitting, tokenization, part of speech tagging, chunking, dependency parsing, anaphora resolution, and the like. For an additional discussion of using topics to find related works, including examples of extracted topics, see the Further Comments and/or Embodiments sub-section of this Detailed Description.

Processing proceeds to operation S265, where density scoring mod 365 generates a density score for the idea based on one or more publication date densities of the set of related works. That is, in this operation, mod 365 generates a density score that is generally related to: (i) how recently the related works were published; and (ii) how dense the set of related works is. In many embodiments, the more recent the publication, and the more dense the set, the more valuable the idea description is likely to be.

In certain embodiments, the density score is further based on one or more baseline publication date densities of a set of baseline (for example, randomly selected) works. For example, some embodiments determine publication date densities for a set of randomly selected works and the determined set of related works. Those densities may then be compared and/or combined to form an overall density score. For example, the mean and standard deviation of the one or more baseline publication date densities may be used to normalize the publication date density of the set of related works. Furthermore, in certain cases, the densities are calculated using exponential decay functions, where more recent works are weighted more heavily (in fact, exponentially so) than works that were published earlier. For additional discussion of exponential decay functions, publication date densities, and baselines, including detailed examples for calculating densities, see the Further Comments and/or Embodiments sub-section of this Detailed Description.

Processing proceeds to operation S270, where novelty scoring mod 370 generates a novelty score for the idea based on a comparison of the idea description to the set of related works. That is, in this operation, the idea description is compared to the determined set of related works to generate a novelty score representing how similar (or, more specifically, dissimilar) the idea description is to the set of related works. Many known (or yet to be known) methods for determining similarity may be used. In the present example embodiment, where the idea description is an invention disclosure, mod 370 extracts patent claims from the idea description, and then searches the set of related works for those claims. In some cases, the claims are included (that is, already written) as part of the idea description, and in other cases the claims are automatically generated (for example, by sub-system 104) based on the content of the idea description. For an example of the calculation of novelty scores according to an embodiment of the present invention, see the Further Comments and/or Embodiments sub-section of this Detailed Description.

Processing proceeds to operation S275, where assess value mod 375 assesses the value of the idea based on the generated density score and the generated novelty score. Mod 375 may assess the value of the idea description in a wide variety of ways, including, for example, by calculating a weighted sum of the density score and the novelty score. For example, in certain embodiments, weights for the density score and the novelty score are determined by training an artificial neural network. However, this is certainly not meant to be limiting, and a wide variety of weighing methods may be used. For an example of such a method, see the Further Comments and/or Embodiments sub-section of this Detailed Description.

In certain embodiments, program 300 further compares the assessed value of the idea description to a predetermined threshold. If the assessed value is greater than the threshold, then the idea description is determined to be valuable. In the present example embodiment, for example, the assessed value represents a predicted patentability of the idea and a corresponding value of one or more patents that may obtained utilizing the idea description. As such, if the assessed value is greater than the predetermined threshold, disclosure assessment system 100 determines (or recommends) that the idea description should be utilized in preparing a patent application. In some embodiments, this determination is considered along with determinations made by one or more of the other sub-systems 104, 106, 108, 110, 112 of disclosure assessment system 100, in order to provide a more complete picture of the merits of the particular idea description.

III. Further Comments and/or Embodiments

Some embodiments of the present invention recognize the following facts, potential problems and/or potential areas for improvement with respect to the current state of the art: (i) currently, disclosure (or patent) evaluation requires novelty searchers (such as subject matter experts) to manually search for prior art and then manually evaluate the novelty of a disclosure compared to the prior art; (ii) determining how many patents exist in a field (for example, for valuation purposes) similarly requires a manual search and evaluation; (iii) novelty searching and valuation is time-consuming and difficult to standardize; and (iv) novelty searching and valuation requires a significant amount of knowledge and understanding of the idea being searched.

Certain embodiments of the present invention use machine logic to determine the value of a patent disclosure based on the following factors: (i) how dense the disclosure's field is (for example, how many patents and publications apply to the same field as the disclosure); and (ii) how novel the disclosure is. In some embodiments, the field of the patent disclosure is determined and existing works in that field are extracted. Those works are used to compute a density score, which is combined with a novelty score to determine the overall patent value.

Certain embodiments of the present invention generate a density baseline for measuring subject matter density by bootstrapping from a random sample of topics and concepts. In an embodiment, the generation of the density baseline utilizes exponential decay to determine relevance. The density baseline can help determine how crowded a particular subject (or "space") is, and can be used to calculate a density score for a disclosure given that disclosure's subject. Further, in some embodiments, the density score can be combined with a novelty score to determine the overall value (for example, the patent value) of the disclosure.

Figure 4:
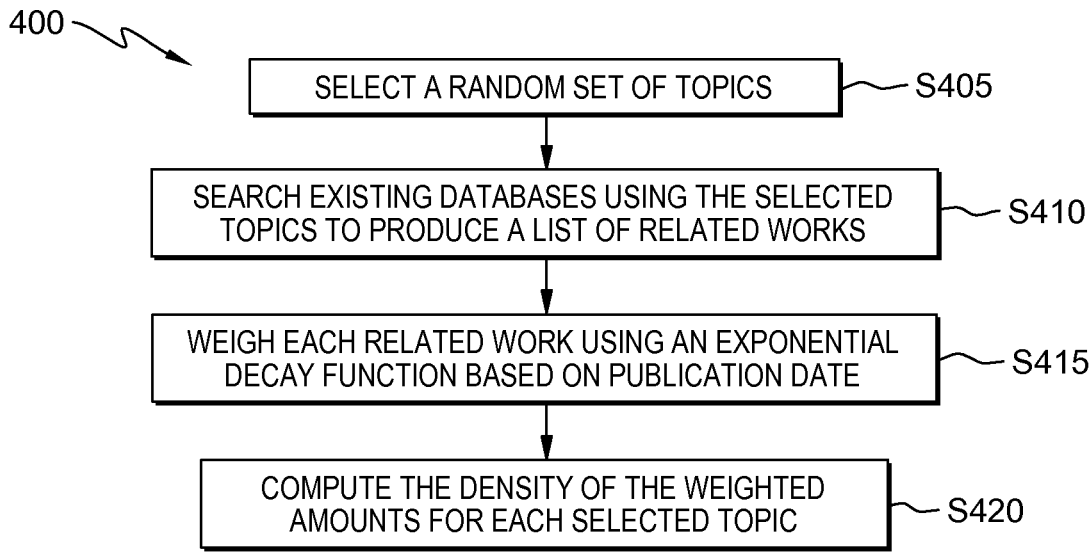
FIG. 4 is a flowchart showing a method for generating a density baseline according to a second embodiment of a system according to the present invention.

FIG. 4 shows flowchart 400 depicting a method for generating a density baseline according to a second embodiment of a system according to the present invention. Processing begins with operation S405, where the system selects a random set of topics (also referred to as "concepts"). In one example embodiment (referred to in this sub-section as the "present embodiment," the "present example," the "present example embodiment," and the like), the random set includes the following topics: (i) Ontology Generation; (ii) Computer Vision; and (iii) Machine Translation.

Processing proceeds to operation S410, where the system searches existing databases using the selected topics to produce a list of related works. Some examples of databases that may be searched include, but are not limited to: (i)

patent databases; (ii) patent publication databases; (iii) invention disclosure databases; (iv) scholarly article databases; and/or (v) the entire collection of works available on the Internet (for example, works searchable using Internet search engines).

Processing proceeds to operation S415, where the system weighs each related work using an exponential decay function based on publication date, thereby creating weighted amounts for each work corresponding to the work's respective age. In certain embodiments, the exponential decay function is based on the time between the publication date and the present date.

Referring again to the present example (where the random set of topics includes Ontology Generation, Computer Vision, and Machine Translation), the publish date of each result is stored, such that each topic has a respective list of dates. Some example dates include: (i) for Ontology Generation—Mar. 4, 2014, Jul. 6, 2010, and Mar. 5, 2006; and (ii) for Computer Vision—Apr. 1, 2014. In this example, each date is then replaced with the distance between the publication date and the present date, in years, the results of which include: (i) for Ontology Generation—0.35, 3.91, and 8.22, respectively; and (ii) for Computer Vision—0.24. The system then replaces each value with the result of an exponential decay function, such as Equation 1:

Exponential Decay Function $$f(x) = \exp\left(1 - \frac{x}{4}\right) \quad \text{Equation 1}$$

Referring still to the present example, when the exponential decay function in Equation 1 is applied to the example data, the following values are computed: (i) for Ontology Generation—2.49, 1.02, and 0.35, respectively; and (ii) for Computer Vision—2.56. As will be made more apparent below, it should be noted that these values are provided for example purposes and include only a subset of all of the values computed in the present example.

Processing proceeds to operation S420, where the system computes the density of the weighted amounts for the selected topics. In other words, to compute a density baseline, the system computes a density value corresponding to the entire list of related works. In the present embodiment, the density includes the mean and standard deviation of the set of weighted amounts.

Referring still to the present example, in order to compute the density of the weighted amounts, the system computes the sum of the weighted amounts for each topic. Specifically, the system calculates the following sums: (i) for Ontology Generation—35; (ii) for Computer Vision—47; and (iii) for Machine Translation—41. Then, the system calculates the mean and standard deviation for the set, resulting in a mean (or "$\mu$") of 41 and a standard deviation (or "$\sigma$") of 4.90.

Figure 5:
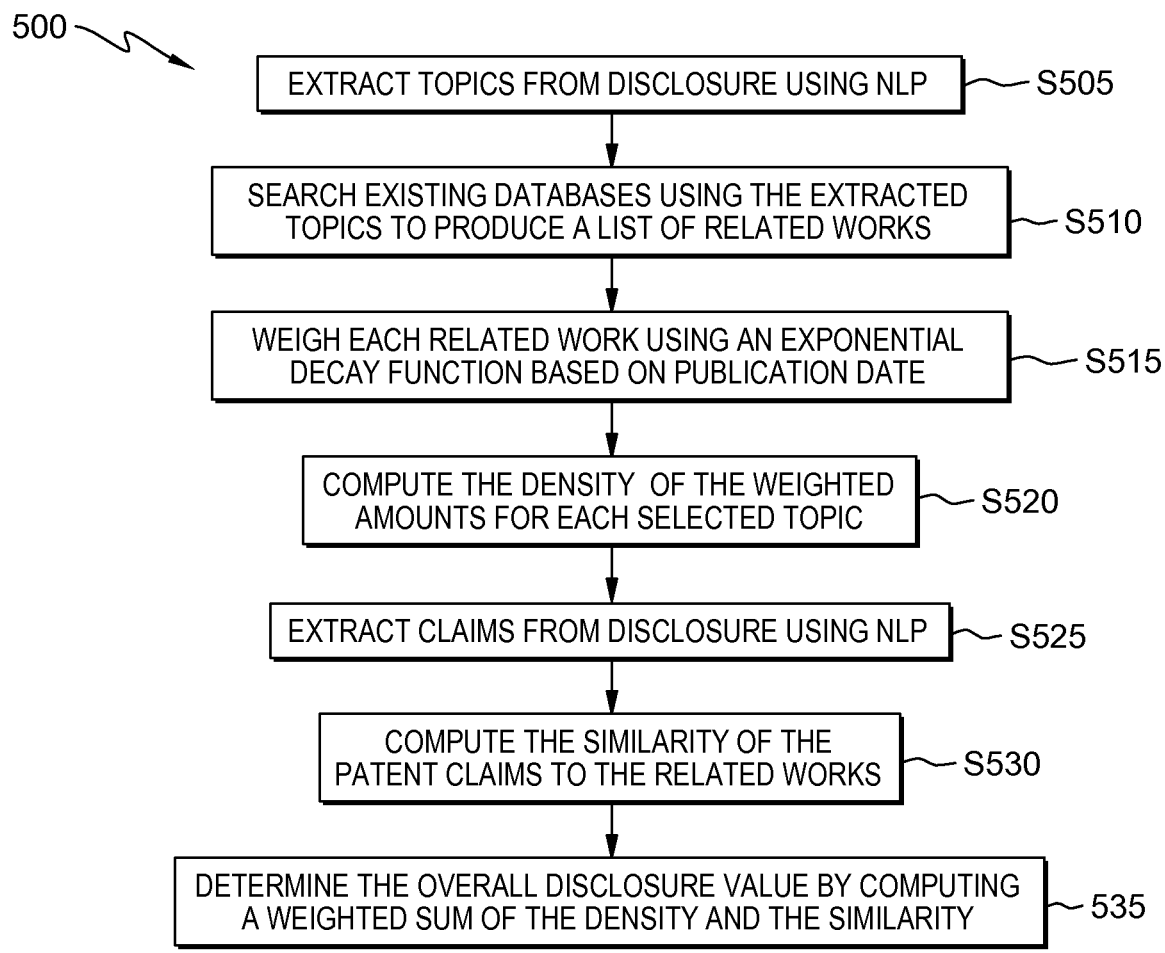
FIG. 5 is a flowchart showing a method for calculating a value for a new disclosure (for example, an invention disclosure) according to the second embodiment system.

FIG. 5 shows flowchart 500 depicting a method for calculating a value for a new disclosure (for example, an invention disclosure) according to the second embodiment system. Processing begins with operation S505, where the system extracts topics from the disclosure using natural language processing (NLP). In certain embodiments, the extracted topics are weighted according to their relevance to the disclosure.

Referring again to the present example, the following topics (shown with their corresponding weights) are extracted from the disclosure during operation S505: (i) Cloud (0.25); (ii) Machine Learning (0.50); and (iii) Domain Adaptation (0.25).

Processing proceeds to operation S510, where the system searches existing databases using the extracted topics to produce a list of related works. In certain cases, the databases searched are the same databases searched in operation S410 (discussed above).

Processing proceeds to operation S515, where the system weighs each related work using an exponential decay function based on publication date, thereby creating weighted amounts for each related work corresponding to the work's respective age. In certain cases, the exponential decay function is the same exponential decay function (Equation 1) used during operation S415 (discussed above).

Processing proceeds to operation S520, where the system computes the density of the weighted amounts for the selected topics. As with operation S420 (discussed above), in the present embodiment, the density includes the mean and standard deviation of the set of weighted amounts. Specifically, in this embodiment, the density is represented by the following equation (Equation 2), where N represents the weighted number of search hits, and $\mu$ and $\sigma$ represent the previously discussed mean and standard deviation of the density baseline:

Density Function $$D = \frac{N - \mu}{\sigma} \quad \text{Equation 2}$$

Referring still to the present example, in order to compute the density of the weighted amounts, the system computes the sum of the weighted amounts for each topic. Specifically, the system calculates the following sums: (i) for Cloud—53; (ii) for Machine Learning—32; and (iii) for Domain Adaptation—30. In this example, N is computed by multiplying each of these sums by their respective topic weights and summing the results. As a result, the density function for the present example is as follows:

Density Function for the Present Example $$D = \frac{((53 \times 0.25) + (32 \times 0.5) + (30 \times 0.25)) - 41}{4.9} \quad \text{Equation 3}$$

The resulting density for the disclosure, as compared to the density baseline, is −0.87.

Processing proceeds to operation S525, where the system extracts patent claims from the disclosure using NLP. As stated above in relation to operation S260, the various NLP techniques such as sentence splitting, tokenization, part of speech tagging, chunking, dependency parsing, and anaphora resolution may be used.

Processing proceeds to operation S530, where the system computes the similarity of the patent claims to the related works. In computing the similarity, the system may use distributional semantics (such as Latent Semantic Analysis, for example), machine translation, and/or other passage matching techniques. In some cases, the patent claims are compared to patent claims from the related works; however, that is not always the case. In certain cases, the patent claims from the disclosure are compared to the entirety of the related works in order to determine similarity.

In certain embodiments, the computed similarity is represented by similarity scores. These similarity scores may be normalized into one value representing the aggregate novelty value for the disclosure. Equation 4, below, is an example of a novelty function for combining scores into a normalized value, where max(scores) represents the maximum score and max(10, scores) represents the 10 highest scores after the highest:

$$\text{Novelty} = \max(\text{scores}) + (1 - \max(\text{scores}))(\text{avg}(\max(10, \text{scores})))$$
Equation 4—Normalized Novelty Score Referring again to the present example, the following similarity scores are computed during operation S530: 0.6, 0.3, 0.3, 0.25, 0.1, 0.1, 0.1, 0.1, 0.1, 0.1, and 0.1. As such, the normalized novelty score equals 0.6+(1−0.6)(0.155), which equals 0.662.

Processing proceeds to operation S535, where the system determines the overall disclosure value by computing a weighted sum of the density and the similarity. For example, the weighted sum may be calculated according to the following equation, where a and b are weights that have been optimized through training:

$$\text{Value} = a(\text{Density}) + b(\text{Novelty})$$
Equation 5—Disclosure Value In the present example, a and b both equal −0.5. As such, the value of the disclosure is −0.5(−0.87)+−0.5(0.662), which equals 0.104. In this embodiment, disclosure values that are greater than zero are considered valuable. As such, the present disclosure is determined to be valuable and the system recommends pursuing patent protection.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user or subscriber; and/or (iii) a group of related users or subscribers.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

What is claimed is:

1. A computer-implemented method comprising:
    extracting, by one or more processors, a set of topics from an idea description using topic extraction;
    searching, by one or more processors, a set of databases to identify a set of works related to the set of topics, wherein each work of the set of works corresponds to one or more respective topics of the set of topics;
    searching, by one or more processors, the set of databases to identify a set of randomly selected works related to a set of randomly determined topics, wherein each randomly selected work of the set of randomly selected works corresponds to one or more respective randomly determined topics of the set of randomly determined topics;
    automatically generating, by one or more processors, a set of related publication date densities of the set of works by, for each topic of the set of topics:
        weighing the works of the set of works that correspond to the topic by, for each work: (i) determining a distance between a publication date of the work and the present date, (ii) multiplying the determined distance by a predetermined value, (iii) calculating the exponential of the difference between one and the multiplied distance, and (iv) using the calculated exponential as the weight for the work, and
        calculating a sum of the weights for the works that correspond to the topic;
    automatically generating, by one or more processors, a set of baseline publication date densities of the set of randomly selected works by, for each randomly determined topic of the set of randomly determined topics:
        weighing the randomly selected works of the set of randomly selected works that correspond to the randomly determined topic by, for each randomly selected work: (i) determining a distance between a publication date of the randomly selected work and the present date, (ii) multiplying the determined distance for the randomly selected work by the predetermined value, (iii) calculating the exponential of the difference between one and the multiplied distance for the randomly selected work, and (iv) using the calculated exponential for the randomly selected work as the weight for the randomly selected work, and calculating a sum of the weights for the randomly selected works that correspond to the randomly determined topic;

generating, by one or more processors, a density score for the idea description based, at least in part, on a comparison between the set of baseline publication date densities and the set of related publication date densities;

computing, by one or more processors, a similarity of the idea description to the works of the set of works using distributional semantics; and assessing, by one or more processors, a value of the idea description as a patent application based, at least in part, on the density score and the computed similarity to the works of the set of works, wherein the density score and the computed similarity to the works of the set of works are each weighed by respective weights that have been optimized through training of an artificial neural network.

2. The computer-implemented method of claim 1, further comprising:

responsive to determining that the assessed value of the idea description is above a predetermined threshold, recommending, by one or more processors, that the idea description be utilized in preparing a patent application.

3. A computer program product comprising a computer readable storage medium having stored thereon:

program instructions programmed to extract a set of topics from an idea description using topic extraction;

program instructions programmed to search a set of databases to identify a set of works related to the set of topics, wherein each work of the set of works corresponds to one or more respective topics of the set of topics;

program instructions programmed to search the set of databases to identify a set of randomly selected works related to a set of randomly determined topics, wherein each randomly selected work of the set of randomly selected works corresponds to one or more respective randomly determined topics of the set of randomly determined topics;

program instructions programmed to automatically generate a set of related publication date densities of the set of works by, for each topic of the set of topics:

weighing the works of the set of works that correspond to the topic by, for each work: (i) determining a distance between a publication date of the work and the present date, (ii) multiplying the determined distance by a predetermined value, (iii) calculating the exponential of the difference between one and the multiplied distance, and (iv) using the calculated exponential as the weight for the work, and calculating a sum of the weights for the works that correspond to the topic;

program instructions programmed to automatically generate a set of baseline publication date densities of the set of randomly selected works by, for each randomly determined topic of the set of randomly determined topics:

weighing the randomly selected works of the set of randomly selected works that correspond to the randomly determined topic by, for each randomly selected work: (i) determining a distance between a publication date of the randomly selected work and the present date, (ii) multiplying the determined distance for the randomly selected work by the predetermined value, (iii) calculating the exponential of the difference between one and the multiplied distance for the randomly selected work, and (iv) using the calculated exponential for the randomly selected work as the weight for the randomly selected work, and calculating a sum of the weights for the randomly selected works that correspond to the randomly determined topic;

program instructions programmed to generate a density score for the idea description based, at least in part, on a comparison between the set of baseline publication date densities and the set of related publication date densities;

program instructions programmed to compute a similarity of the idea description to the works of the set of works using distributional semantics; and program instructions programmed to assess a value of the idea description as a patent application based, at least in part, on the density score and the computed similarity to the works of the set of works, wherein the density score and the computed similarity to the works of the set of works are each weighed by respective weights that have been optimized through training of an artificial neural network.

4. The computer program product of claim 3, the computer readable storage medium having further stored thereon:

program instructions programmed to, responsive to determining that the assessed value of the idea description is above a predetermined threshold, recommend that the idea description be utilized in preparing a patent application.

5. A computer system comprising:

a processor(s) set; and a computer readable storage medium;

wherein:

the processor set is structured, located, connected and/or programmed to run program instructions stored on the computer readable storage medium; and the stored program instructions include:

program instructions programmed to extract a set of topics from an idea description using topic extraction;

program instructions programmed to search a set of databases to identify a set of works related to the set of topics, wherein each work of the set of works corresponds to one or more respective topics of the set of topics;

program instructions programmed to search the set of databases to identify a set of randomly selected works related to a set of randomly determined topics, wherein each randomly selected work of the set of randomly selected works corresponds to one or more respective randomly determined topics of the set of randomly determined topics;

program instructions programmed to automatically generate a set of related publication date densities of the set of works by, for each topic of the set of topics:
- weighing the works of the set of works that correspond to the topic by, for each work: (i) determining a distance between a publication date of the work and the present date, (ii) multiplying the determined distance by a predetermined value, (iii) calculating the exponential of the difference between one and the multiplied distance, and (iv) using the calculated exponential as the weight for the work, and
- calculating a sum of the weights for the works that correspond to the topic;

program instructions programmed to automatically generate a set of baseline publication date densities of the set of randomly selected works by, for each randomly determined topic of the set of randomly determined topics:
- weighing the randomly selected works of the set of randomly selected works that correspond to the randomly determined topic by, for each randomly selected work: (i) determining a distance between a publication date of the randomly selected work and the present date, (ii) multiplying the determined distance for the randomly selected work by the predetermined value, (iii) calculating the exponential of the difference between one and the multiplied distance for the randomly selected work, and (iv) using the calculated exponential for the randomly selected work as the weight for the randomly selected work, and
- calculating a sum of the weights for the randomly selected works that correspond to the randomly determined topic;

program instructions programmed to generate a density score for the idea description based, at least in part, on a comparison between the set of baseline publication date densities and the set of related publication date densities;

program instructions programmed to compute a similarity of the idea description to the works of the set of works using distributional semantics; and program instructions programmed to assess a value of the idea description as a patent application based, at least in part, on the density score and the computed similarity to the works of the set of works, wherein the density score and the computed similarity to the works of the set of works are each weighed by respective weights that have been optimized through training of an artificial neural network.

6. The computer-implemented method of claim 1, wherein:
- the topic extraction assigns a weight to each topic of the set of topics based on the respective topic's respective relevance to the idea description, and
- in performing the comparison between the set of baseline publication date densities and the set of related publication date densities, the set of related publication date densities is adjusted based, at least in part, on the weights assigned to each topic of the set of topics during the topic extraction.

7. The computer program product of claim 3, wherein:
- the topic extraction assigns a weight to each topic of the set of topics based on the respective topic's respective relevance to the idea description, and
- in performing the comparison between the set of baseline publication date densities and the set of related publication date densities, the set of related publication date densities is adjusted based, at least in part, on the weights assigned to each topic of the set of topics during the topic extraction.

8. The computer system of claim 5, wherein:
- the topic extraction assigns a weight to each topic of the set of topics based on the respective topic's respective relevance to the idea description, and
- in performing the comparison between the set of baseline publication date densities and the set of related publication date densities, the set of related publication date densities is adjusted based, at least in part, on the weights assigned to each topic of the set of topics during the topic extraction.

9. The computer system of claim 5, wherein the stored program instructions further include program instructions programmed to, responsive to determining that the assessed value of the idea description is above a predetermined threshold, recommend that the idea description be utilized in preparing a patent application.

* * * * *